PLASTIC REEL WITH ALUMINUM INSERT HUB

Original Filed Dec. 11, 1963

INVENTOR.
ARNOLD P. HULTGREN
BY Bair, Freeman & Molinare Attys.

PLASTIC REEL WITH ALUMINUM INSERT HUB

Original Filed Dec. 11, 1963 Sheet 2 of 2

INVENTOR.
ARNOLD P. HULTGREN
BY Bair, Freeman & Molinare Attys.

United States Patent Office

Re. 26,556
Reissued Mar. 25, 1969

26,556

PLASTIC REEL WITH ALUMINUM INSERT HUB

Arnold P. Hultgren, River Forest, Ill., assignor, by mesne assignments, to Amerline Corporation, a corporation of Illinois Original No. 3,236,473, dated Feb. 22, 1966, Ser. No. 329,666, Dec. 11, 1963. Application for reissue June 27, 1966, Ser. No. 562,980
Int. Cl. B65h *75/18*
U.S. Cl. 242—71.8 7 Claims

Matter enclosed in heavy brackets [ ] appears in the original patent but forms no part of this reissue specification; matter printed in italics indicates the additions made by reissue.

*ABSTRACT OF THE DISCLOSURE*

*A tape storage and winding reel for magnetic tape wherein the reel uses no mechanical fasteners. The reel includes a metallic hub which has first and second sides. A first flange of molded plastic is positioned on one side of the hub, and the flange includes an integral projecting connecting portion having an inner surface. A second flange, of molded plastic is positioned on the second side of the hub and a tape winding channel is defined between the flanges. The second flange includes integral projecting connecting means having an outer surface. The outer and inner surfaces are in telescoping side by side relationship, and a plastic adhesive means is applied to the inner and outer surface to securely bond the two flanges together on the opposite sides of the hub.*

In its present state, the art of magnetic recording on plastic-base tape is more limited by mechanical factors than by the magnetic properties. All major type manufacturers are capable of producing magnetic coatings having excellent uniformity and magnetic characteristics. Unfortunately, the full benefits of these achievements are not realized because tape develops mechanical distortions. Investigations have shown that these mechanical distortions in magnetic tapes are directly related to the nature of reels used for its storage and to the manner in which the tape is wound on the reels.

These investigations show that at the high reel angular accelerations and velocities utilized in magnetic tape winding the tension of the tape tends to compress and elongate the center hub resulting in nonuniform winding with concomitant distortion of the tape.

In addition, the high radical forces exerted by tape wound on a plastic hub, coupled iwth a tendency of plastic resins to collapse or cold flow under prolonged high pressure, frequency make it impossible to get the plastic hub reel on a spindle. This problem is multiplied where there is a tape slot provided in the plastic hub. To eliminate these conditions hubs having low weight but high strength characteristics are required.

To achieve uniformity of winding it is also important that the flanges be perfectly parallel and, providing for minimum clearances, that the spacing between the flanges closely approximate the width of the tape. Any mechanical distortion of the hub will serve to misalign the flanges.

Present combination metallic hub—plastic flange reels all use mechanical fasteners to complete the assembly.

Use of mechanical fasteners often results in misalignment of the flanges because of difficulty in adjusting said fasteners uniformly.

Since magnetic tape is often designed to carry multiple information tracks, it is important that the reel and, more particularly, the reel hub design be such that, after mounting on a computer spindle, each of the multiple information tracks on the tape wound thereon will be precision located with respect to the head (transducer) of the computer.

Because mechanical distortions of the tape (voids and wrinkles) can develop during storage due to temperature changes and the resulting interacting expansion and contraction of the reel hub and tape, metallic hubs having temperature coefficients of expansion close to that of the tape are highly desirable.

Since even minute particles of metal embedded in, or clinging to the magnetic tape can cause "drop out" (loss of information) and may result in poor contact between the tape and the head (transducer) of a computer; it is important to make provision in the reel construction for total insulation of the tape from the metallic hub.

It is a primary object of this invention to provide a combination reel having a unitary metal hub and plastic flanges which obviates the problems heretofore encountered.

In accordance with the present invention, the improved reel consists of a light, strong, uniquely designed metallic hub capable of withstanding high radial forces without distortion and capable of easy and inexpensive precision assembly with mated flanges without use of mechanical fasteners, thus providing a uniform insulated winding channel, said improved reel tending to eliminate or minimize mechanical distortions of tape wound thereon.

More specifically, another object of the present invention is to provide a magnetic tape reel of the above type having a uniquely designed metallic hub of high strength, low weight, and appropriate coefficient of thermal expantion, easily machinable to permit rapid precision assembly with pre-molded flanges and adaptable to carry information plates thereon.

*It is another object of the invention to provide a computter tape reel having molded plastic flanges and a metallic hub, wherein the plastic flanges are adhesively secured together on opposite sides of the hub by telescoping means projecting from the opposite flanges.*

A further object of the present invention is to provide a magnetic tape reel of the above type capable of rapid and inexpensive precision assembly, without use of mechanical fasteners, providing a tape channel between the flanges of uniform width held to close tolerances, said tape channel being insulated from the metallic hub by the manner in which the flanges are mated, and with the center of the winding channel being a predetermined accurate distance from an edge of the spindle member.

The novel features which I believe to be characteristic of my invention are set forth with particularity in the appended claims. My invention itself, together with other objects and advantages thereof, will be best understood by reference to the following description taken in connection with the accompanying drawings.

The reel illustrated has an annular plane female flange 4 molded from plastic or other suitable non-metallic material with axial bore 6 concentrically mated to a metallic hub 8 with the axial edge 10 of the spindle member of the hub exposed. Perforations 14 of various configuration may be provided in the flange for functional or design purposes.

Figure 1:
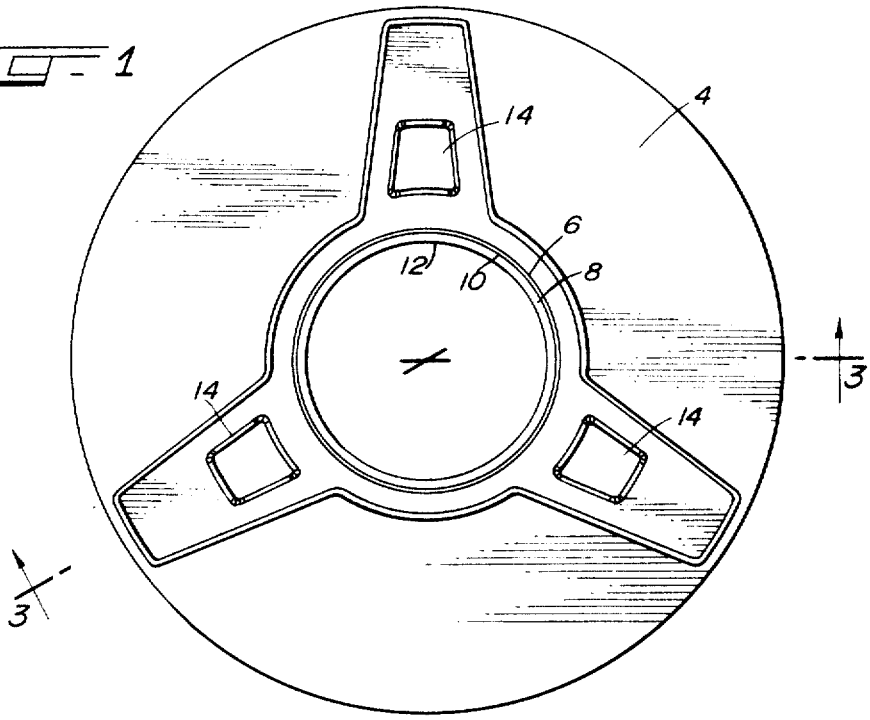
FIGURE 1 is an axial view of a magnetic tape reel embodying the principles of the present invention.
Figure 2:
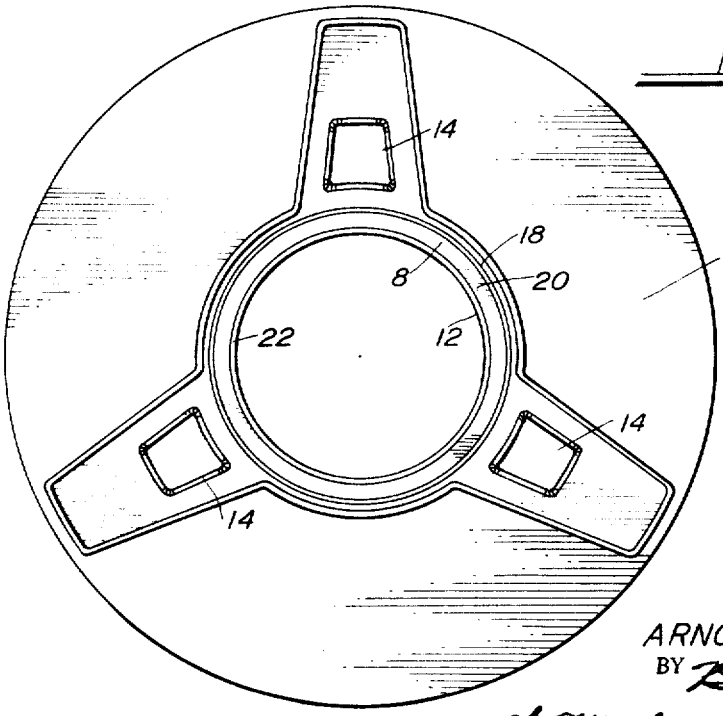
FIGURE 2 is an axial view of the reel from the opposite side of FIGURE 1.

A cooperating angular plane male flange 16 (FIG. 2) has an axial bore 18 and is concentrically mated to a metallic hub 8 with axial channel 20 in the hub exposed. Edge 22 of the spindle member 12 of the hub 8 is adaptable, in conjunction with channel 20, to support a file protector plate (not shown).

Figure 4:
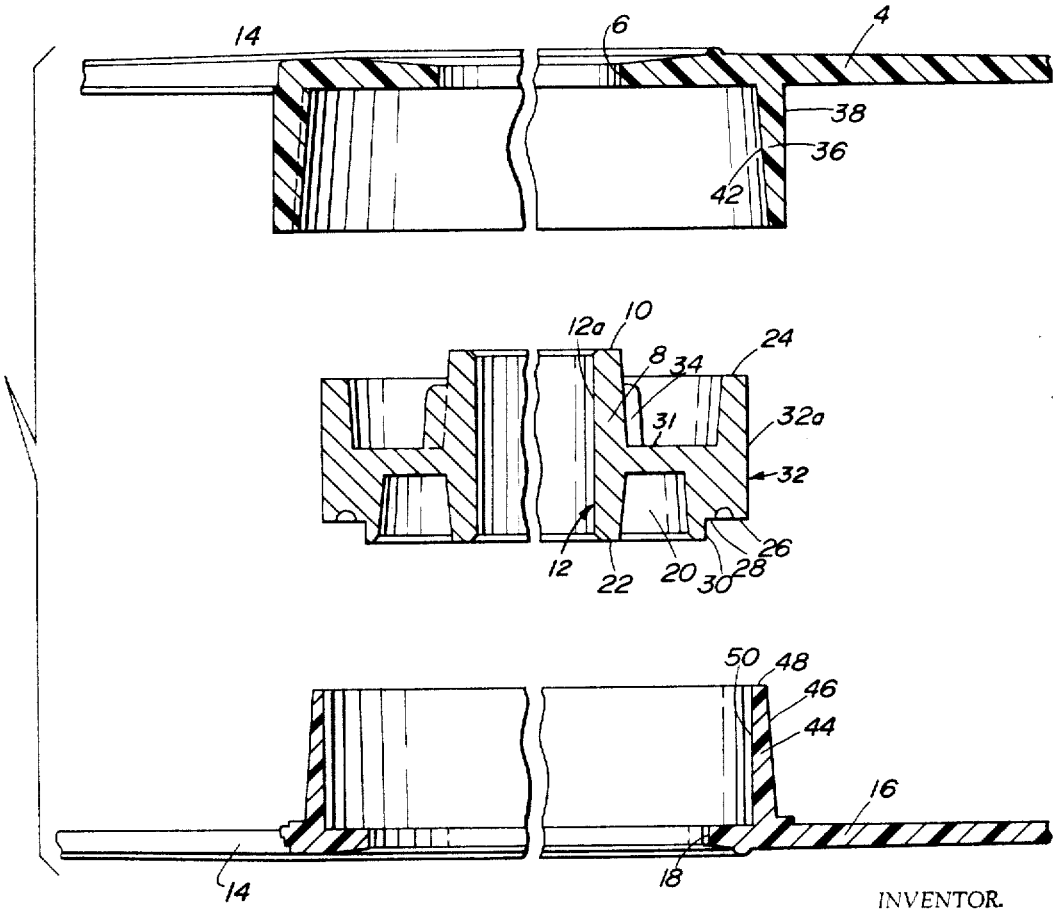
FIGURE 4 is a fragmentary exploded cross-sectional view of the hub portion of the reel.

This invention may be more easily understood by reference to FIGURE 4 in which the central figure shows in detail the metallic hub 8. The hub 8 can be integrally made of any light, strong metal such as aluminum or aluminum alloy by any of the conventional production methods, and embodies a spindle member 12 and an opposed flange-mating member 32 joined by a web 31 disposed normally to the axis of the hub. The cross section shows that strength is derived from the hub's substantially I-beam construction formed by members 12, 31, 32. Normal machining operations provide precision dimensioned surfaces identified at 10, 12a, 22, 24, 26, 28, 30 and 32a. A plurality of regularly spaced vertical ribs 34 extending axially of the hub, strengthen the spindle member 12 of the I-beam construction and limit downward movement of flange 4.

The upper figure of FIGURE 4 shows the female flange 4 with an upstanding female flange collar 36 and axial bore 6. The female flange collar 36 has outer tape winding surface 38 and inner surface 42. The lower figure of FIGURE 4 shows the male fiange 16 with male flange collar 44 has outer mating surface 46 and hub mating surface 50. In practice, the male 16 and female 4 flanges are molded to approximate configuration and dimension by any of the well known plastic molding techniques. Both faces of the collars 36 and 44 are tapered. To provide the precise dimensions desired for assembly with mating parts, the flange collars 36 and 44 are machined on one face to produce the tapered shape shown in FIGURES 3 and 4. After machining, the hub-mating surface 50 of the male flange collar 44 and the outer tape surface 38 of the female flange or both perfectly parallel with the axis of the reel. The mating faces 42 and 46 have a reverse complementary taper to provide a uniform thickness of plastic around the metal hub 8. A critical machined dimension on the metallic hub 8 is that between surface 24 and surfaces 26 and 28 of member 32. This dimension controls the width of the tape winding channel of the reel. In practice it has been found relatively easy to achieve tape winding channel widths to close tolerances.

Figure 3:
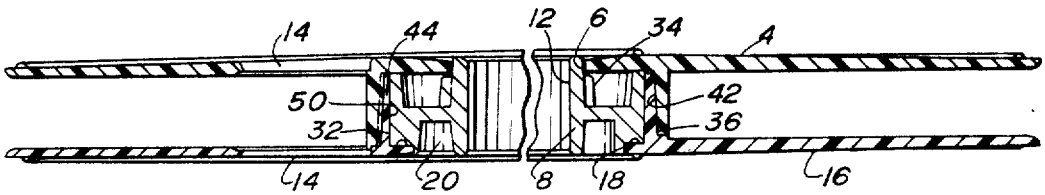
FIGURE 3 is a cross-sectional view of an assembled reel taken along line 3—3 of FIGURE 1.

After machining, an adhesive is applied to the machined hub mating surface 50 of the male flange 16, and the metallic hub 8 is mated therewith. An epoxy resin with amine hardener has been found to be very satisfactory as an adhesive. The parts are clamped together until a strong bond is formed between surface 50 and 32 as the adhesives sets up. The outer mating surface 46 of this male flange-hub subassembly is then dipped into a suitable organic solvent to soften and make the surface tacky. The type of solvent will depend on the nature of the plastic. The female flange 4 is then mated with the subassembly and force is applied axially by means of a clamp for several minutes until the solvent has substantially evaporated and a strong bond is formed between surfaces 42 and 46. The assembled reel is shown in FIGURE 3.

It will be seen from FIGURE 4 that surfaces 26 and 28 provide a two-point contact to form a plane parallel to the plane formed by annular surface 22. The exact dimensioning of the distance between these planes assures precision positioning of the tape with respect to annular surface 22 of spindle member 12, thus providing for proper location of the information tracks on the tape in relation to the head or transducer of a computer.

It will be seen from the above detailed discussion that the uniquely designed unitary metallic hub. With its precision dimensioned mating surfaces, permits inexpensive assembly with flanges having opposed male and female collars. The manner of mating permits total insulation of the magnetic tape wound thereon from contact with the metallic hub. It is also apparent that the critical dimensioning of the opposed surfaces of the spindle and flange mating members of the I-beam hub construction permits precision location of the information tracks on magnetic tape with respect to an edge of the spindle member. This assures accurate positioning of the information tracks when the reel is mounted on a computer. The hub-flange assembly results in a reel having a uniform width tape winding channel with minimum clearances without the undesirable use of mechanical fasteners.

What is desired to be obtained by Letters Patent of the United States is:

1. A tape storage and winding reel devoid of mechanical fasteners comprising, a unitary metallic hub of substantially I-beam radial cross section, said hub having a central spindle member and an opposed flange-mating member, said members being joined by a web disposed normally to the axis of said hub, a male flange of molded plastic, the annular plane surface of said flange being normal to the axis of said hub and said flange having an axially disposed collar, said flange-mating member being adhesively bonded to the inside surface of said axially disposed collar, a female flange of molded plastic, the annular plane surface of said flange being normal to the axis of said hub and said flange having an axially disposed collar, the inside surface of said female flange collar being bonded to the outside surface of said male flange collar and said flanges forming a winding channel totally insulated from said metallic hub by said flange collars.

2. The reel of claim 1 in which said flange-mating member has predimensioned axially opposed surfaces against which said male and female flanges about to define a uniform accurately-dimensioned winding channel.

3. The reel of claim 2 in which said spindle member is accurately axially dimensioned in relation to said predimensioned axially opposed surfaces of said flange-mating member such that the center of the winding channel formed by the male and female flanges in a predetermined distance from an edge of said spindle member.

4. The reel of claim 1 which includes an external axially exposed-channel in said metallic hub for attaching identification plates thereto.

*5. A tape storage and winding reel for magnetic tape wherein said reel is devoid of mechanical fasteners, said reel comprising an integral metallic hub of substantially I-beam radial cross section and having first and second sides, a first annular plane flange of molded plastic on said first side of said hub, integral connecting means on said first flange having an inner surface, a second annular plane flange of molded plastic on the second side of said hub to define a tape winding channel between said flanges, integral connecting means on said second flange and having an outer surface, each of said connecting means projecting inwardly towards each other, said outer surface and said inner surface being in telescoping side by side relationship, and adhesive means for plastic for securely bonding said inner and outer surfaces together and to thereby also secure said flanges together on opposite sides of said hub.*

*6. The device of claim 5 wherein adhesive means are provided for bonding said plastic flanges to said metallic hub.*

*7. The device of claim 5 wherein each of said integral connecting means comprises a continuous collar, and said telescoping collars are positioned between said metallic hub and tape wound between said channels.*

References Cited

The following references cited by the Examiner, are of record in the patented file of this patent or the original patent.

UNITED STATES PATENTS

| | | | |
|---|---|---|---|
| 2,781,985 | 2/1957 | Hoffstedt | 242—118.7 |
| 3,053,466 | 9/1962 | Rehklau | 242—68.3 |
| 3,088,689 | 5/1963 | Perlini. | |
| 3,189,294 | 6/1965 | Morningstar et al. | 242—74 X |
| 3,250,482 | 5/1966 | Whitnah | 242—71.1 X |
| 2,625,343 | 1/1953 | Foote | 242—118.1 |
| 2,766,947 | 10/1956 | Hultgren | 242—71.8 |
| 3,088,689 | 5/1963 | Perlini | 242—71.8 |

WILLIAM S. BURDEN, *Primary Examiner.*